(12) United States Patent
Jaboviste et al.

(10) Patent No.: US 11,885,391 B2
(45) Date of Patent: Jan. 30, 2024

(54) DEVICE COMPRISING A SET OF VIBRATION ABSORBERS AND VEHICLE EQUIPPED WITH SUCH A DEVICE

(71) Applicants: Thales, Courbevoie (FR); Centre national de la recherche scientifque, Paris (FR); Universite De Franche-Comte, Besancon (FR)

(72) Inventors: Kevin Jaboviste, Elancourt (FR); Gaël Chevallier, Besancon (FR); Emeline Sadoulet-Reboul, Venise (FR); Nicolas Peyret, Versailles (FR); Eric Collard, Elancourt (FR); Charles Arnould, Elancourt (FR)

(73) Assignees: THALES, Courbevoie (FR); CENTRE NATIONAL DE LA RECHERCHE SCIENTIFQUE, Paris (FR); UNIVERSITE DE FRANCHE-COMTE, Besancon (FR)

( * ) Notice: Subject to any disclaimer, the term of this patent is extended or adjusted under 35 U.S.C. 154(b) by 190 days.

(21) Appl. No.: 17/428,890

(22) PCT Filed: Feb. 11, 2020

(86) PCT No.: PCT/EP2020/053400
§ 371 (c)(1),
(2) Date: Aug. 5, 2021

(87) PCT Pub. No.: WO2020/165128
PCT Pub. Date: Aug. 20, 2020

(65) Prior Publication Data
US 2022/0074460 A1    Mar. 10, 2022

(30) Foreign Application Priority Data
Feb. 11, 2019 (FR) ........................ 19 01321

(51) Int. Cl.
*F16F 7/104* (2006.01)
*B64C 1/00* (2006.01)
*F16M 13/02* (2006.01)

(52) U.S. Cl.
CPC ................ *F16F 7/104* (2013.01); *B64C 1/00* (2013.01); *F16M 13/02* (2013.01); *F16F 2222/08* (2013.01); *F16F 2228/04* (2013.01)

(58) Field of Classification Search
CPC .... F16F 7/104; F16F 2222/08; F16F 2228/04; F16F 1/20; F16F 1/22; F16F 1/368;
(Continued)

(56) References Cited

U.S. PATENT DOCUMENTS

| 2,920,884 | A |   | 1/1960 | Rowland et al. |
|---|---|---|---|---|
| 4,868,447 | A | * | 9/1989 | Lee ........................ H10N 30/87 310/365 |

(Continued)

FOREIGN PATENT DOCUMENTS

| EP | 2 350 491 A1 | 8/2011 |
|---|---|---|
| FR | 1 258 934 A | 4/1961 |

(Continued)

OTHER PUBLICATIONS

International Search Report issued by the International Search Authority in corresponding International Application No. PCT/EP2020/053400, dated Jun. 5, 2020.

(Continued)

*Primary Examiner* — Terrell L McKinnon
*Assistant Examiner* — Jerry Nmn Olivier
(74) *Attorney, Agent, or Firm* — ArentFox Schiff LLP

(57) ABSTRACT

The invention relates to a device comprising a body and a set of vibration absorbers mounted on the body, each absorber being movable relative to the body between a first position and a second position, each absorber being capable of (Continued)

Figure 1:
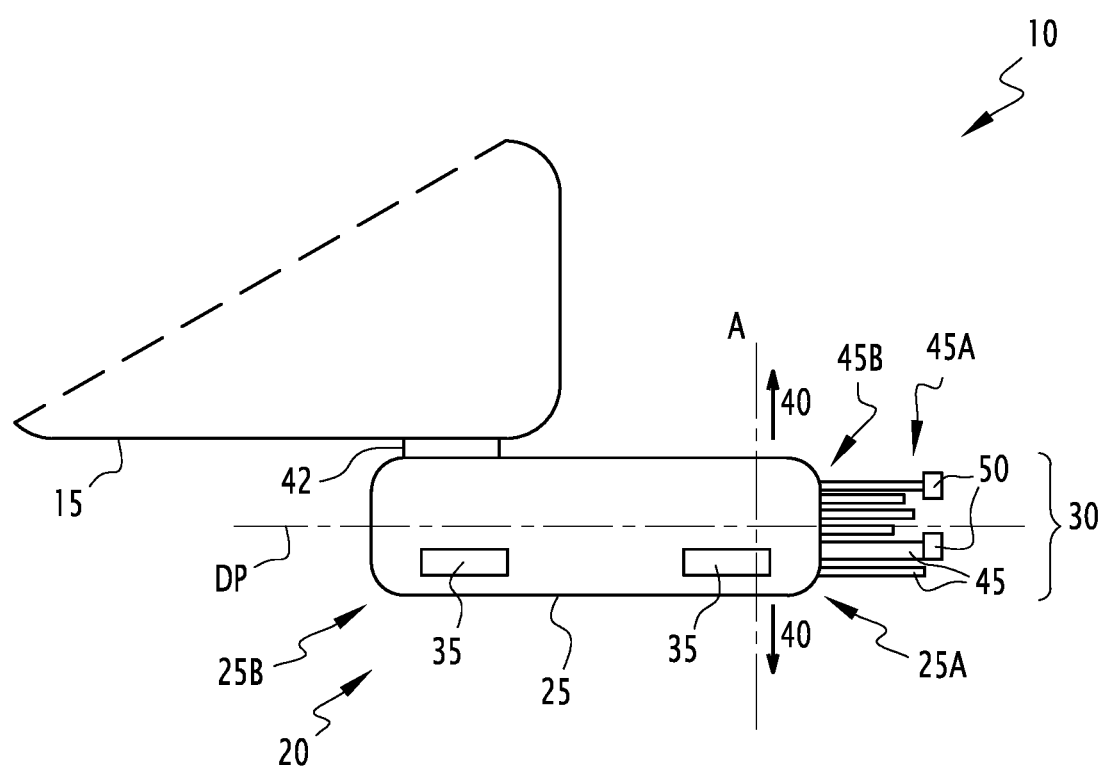

oscillating relative to the body between its first and second positions, a first natural frequency being defined for each absorber, at least one absorber having a first natural frequency different from the first natural frequency of another absorber.

Each absorber comprises at least one deformation part capable of deforming as the vibration absorber oscillates between its first position and its second position, the deformation part having at least two faces configured to rub against each other during the deformation of the deformation part.

10 Claims, 8 Drawing Sheets

(58) Field of Classification Search
CPC ......... F16F 1/182; F16F 2236/10; B64C 1/00; F16M 13/02
See application file for complete search history.

(56) References Cited

U.S. PATENT DOCUMENTS

| 2006/0169557 | A1 | | 8/2006 | Goetchius |
| 2013/0264419 | A1 | * | 10/2013 | Rammer ............... B64C 27/001 |
| | | | | 244/108 |
| 2014/0008162 | A1 | | 1/2014 | Carcaterra et al. |
| 2020/0347903 | A1 | * | 11/2020 | Romano ............... F16F 7/1034 |

FOREIGN PATENT DOCUMENTS

| FR | 1258934 | * | 4/1961 | ............... F16F 1/20 |
| JP | 563235740 A | | 9/1988 | |

OTHER PUBLICATIONS

Preliminary Search Report issued in corresponding French Patent Application No. 1901321, dated Dec. 2, 2019.

* cited by examiner

DEVICE COMPRISING A SET OF VIBRATION ABSORBERS AND VEHICLE EQUIPPED WITH SUCH A DEVICE

CROSS-REFERENCE TO RELATED APPLICATIONS

The present Application for Patent is a National Stage Entry of International Application PCT/EP2020/053400, filed Feb. 11, 2021, which claims priority to French Patent Application No. 19 01321, filed Feb. 11, 2019. The disclosures of the priority applications are incorporated in their entirety by reference herein.

The present invention relates to a device comprising a set of vibration absorbers. The present invention also relates to a vehicle equipped with such a device.

Devices mounted in mobile structures such as vehicles or fixed structures are frequently susceptible to move relative to the structure when subjected to stresses such as vibration or shock, for example because connecting parts between the device and the structure are not perfectly rigid or because the device itself is not perfectly rigid. As a result, when the structure itself is set in motion or subjected to an impact, the device is frequently set in motion relative to the structure, a motion that is likely to be of great amplitude. This motion is, in particular, a vibration or oscillation, in which the device moves periodically or pseudo-periodically relative to the structure around an equilibrium position between two extreme positions of its motion. These extreme positions are likely to depend on the level of external stresses and therefore vary.

Such oscillation motions have particularly strong amplitudes at specific frequencies called natural frequencies, which are frequencies to which the device is particularly sensitive. Such oscillations are very detrimental to certain applications that require good control of the position or orientation of the device. For example, when the device contains a set of sensors or tools for projecting, for example, a light beam or a directional beam of radio frequency waves, the oscillations greatly reduce the measurement accuracy of the sensors or the spatial accuracy of the illumination obtained. In addition, oscillations contribute to premature wear of the device, since they cause repeated stress in the various materials, especially since they are likely to last much longer than the stress that caused the oscillation.

Dampers made of soft polymers such as elastomers are frequently used, interposed between the device and the supporting structure, whose natural frequencies are sufficiently below the natural frequencies of the device to limit these oscillations and thus reduce their effects. However, the properties of elastomers are likely to vary greatly depending on the temperature, the frequency of the mechanical stresses to which they are subjected, or the magnitude of those stresses. As a result, the ability of elastomer dampers to effectively reduce the amplitude of device oscillations varies greatly with temperature and with the amplitude or frequency of those oscillations. In addition, the existence of natural frequencies of the dampers itself causes oscillations of the device.

It has been proposed to use sets of vibration absorbers, which are elements suspended from the body of the device and which may themselves oscillate relative to the body of the device. By selecting the appropriate stiffnesses, damping ratios and masses of these elements, it is possible to limit the amplitude of the device's oscillations and to damp them quickly. In particular, vibration absorbers are frequently beams attached to the body of the device at one of their ends, although other types of absorbers also exist. In particular, the absorber sets are tuned, i.e. their properties are chosen to best absorb the mechanical energy of the device.

However, these systems require a high degree of precision in controlling their properties, which is difficult since these properties depend mainly on the materials used. In particular, the damping and stiffness properties of state-of-the-art vibration absorbers are difficult to control. For example, the properties of elastomeric vibration absorbers vary with temperature.

There is therefore a need for a device with good damping and stiffness properties, which are stable over a wide temperature range and a wide range of oscillation frequencies.

For this purpose, a device is proposed comprising a body and a set of vibration absorbers mounted on the body, each vibration absorber being capable of oscillating relative to the body between a first and a second position, a first natural frequency being defined for each resonator, at least one vibration absorber having a first natural frequency different from the first natural frequency of another vibration absorber, each vibration absorber comprising at least one deformation part capable of deforming when the vibration absorber oscillates between its first position and its second position, the deformation part having at least two faces configured to exert a shearing force on each other when the deformation part is deformed.

With the invention, the properties of each vibration absorber, and in particular of the deformation part(s), can be changed independently of the material used. In particular, the action of the shear faces against each other allows for increased dissipation of the mechanical energy stemming from the motion of the body compared to the same part without these faces. Moreover, these properties vary little with temperature and the frequency of the motions.

According to particular embodiments of the invention, the device comprises one or more of the following features taken in isolation or in any combination that is technically possible:

the faces configured to exert a shear force on each other when the deformation part is deformed are configured to rub against each other when the deformation part is deformed.

each deformation part comprises a stack of strips superimposed in a stacking direction, the deformation part extending along a direction of elongation between a first end and a second end attached to the body, the direction of elongation being perpendicular to the stacking direction, the deformation part being configured to deform by bending upon oscillation of the vibration absorber, the bending causing a movement of the first end along the stacking direction relative to the first end.

each deformation part further comprises at least one resin or elastomer layer interposed between two strips.

each deformation part comprises at least one rib interposed between two strips, each rib extending in a plane perpendicular to the stacking direction.

each deformation part comprises a reinforcement layer interposed between two strips, the reinforcement layer comprising a set of ribs, the set of ribs delimiting in particular, in a plane perpendicular to the stacking direction, a set of cells.

each vibration absorber comprises a weight suspended from the body via the deformation part(s).

the weight is adapted to move relative to the body in a direction of movement as the vibration absorber oscillates between its first and second positions, at least two deformation parts extending radially outward from the weight in a single plane perpendicular to the direction of movement.

Also proposed is a vehicle equipped with a device as described above, the vehicle being in particular an aircraft.

According to particular embodiments of the invention, the vehicle comprises one or more of the following features taken in isolation or in any combination that is technically possible:

the vehicle comprises a platform, the body being able to oscillate relative to the platform between a third position and a fourth position, a second natural frequency being defined for the body, the first natural frequency of at least one vibration absorber being strictly lower than the second natural frequency and the first natural frequency of at least one further vibration absorber being strictly higher than the second natural frequency.

the body comprises a beam and a head, the beam having a third end and a fourth end and extending in a main direction between the third end and the fourth end, the fourth end being attached to the platform, the body being capable of oscillating relative to the platform between a third position and a fourth position, the head being attached to the third end, each vibration absorber being mounted on the third end of the beam.

Figure 2:
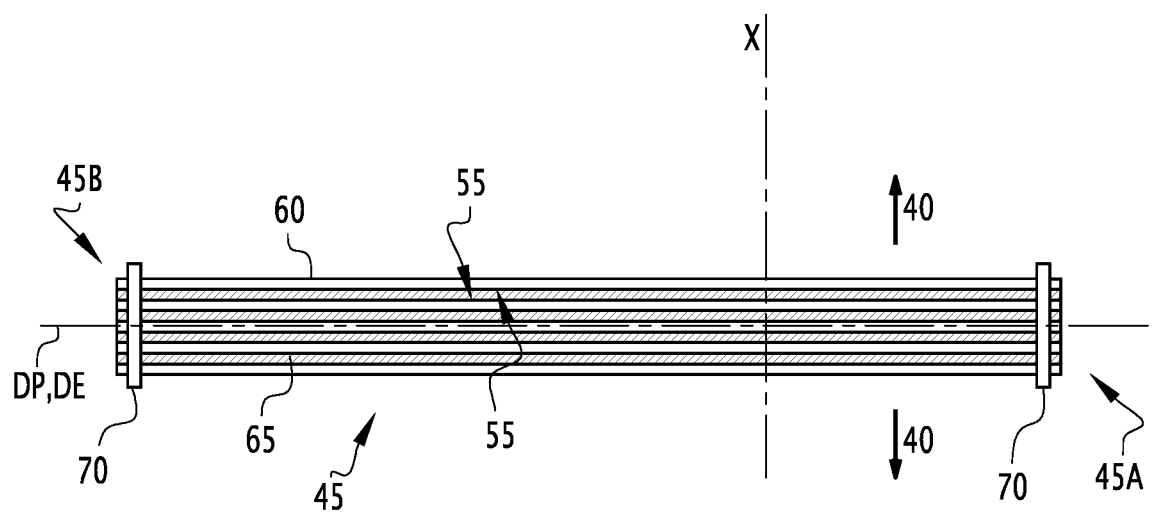
Figure 3:
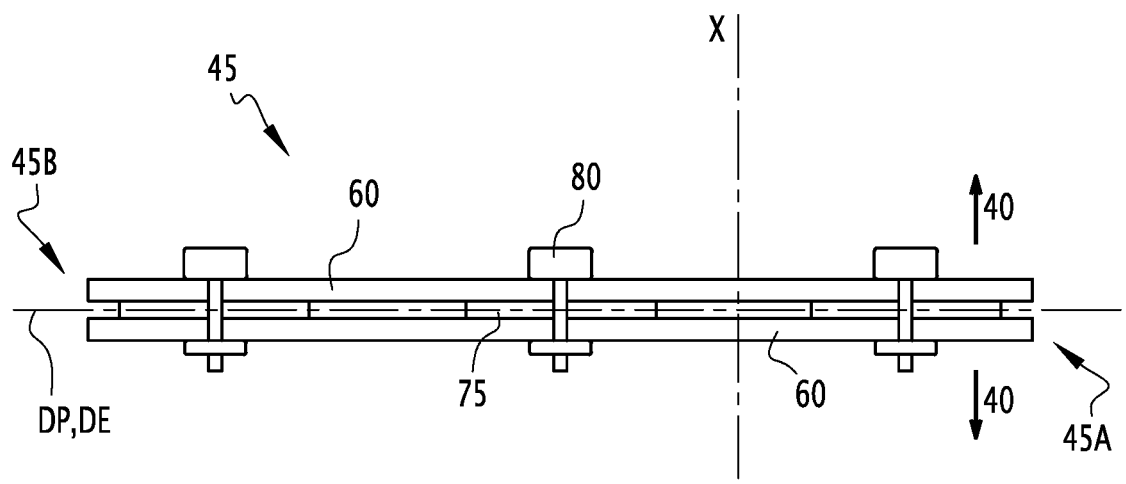
Figure 4:
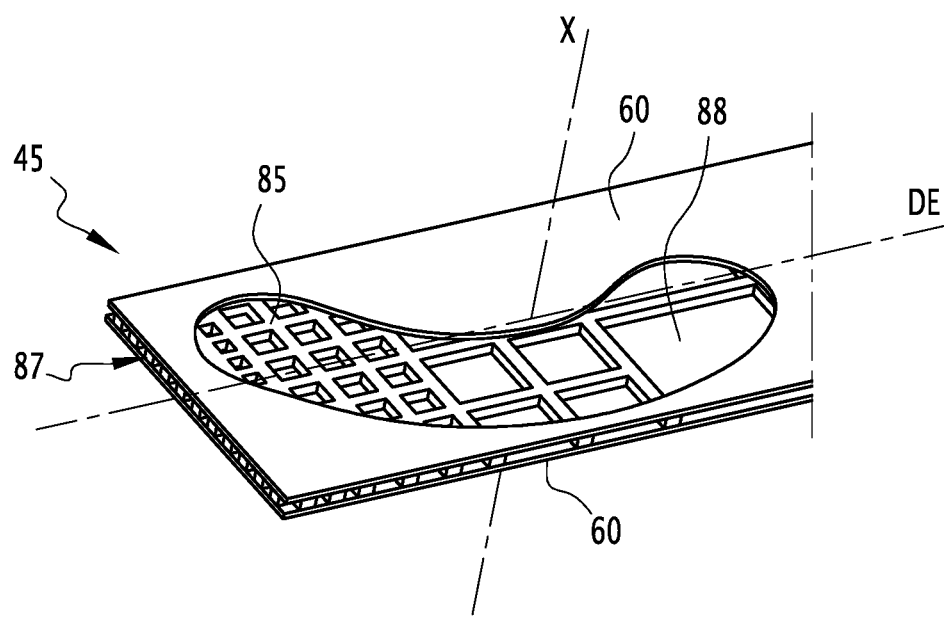
Figure 5:
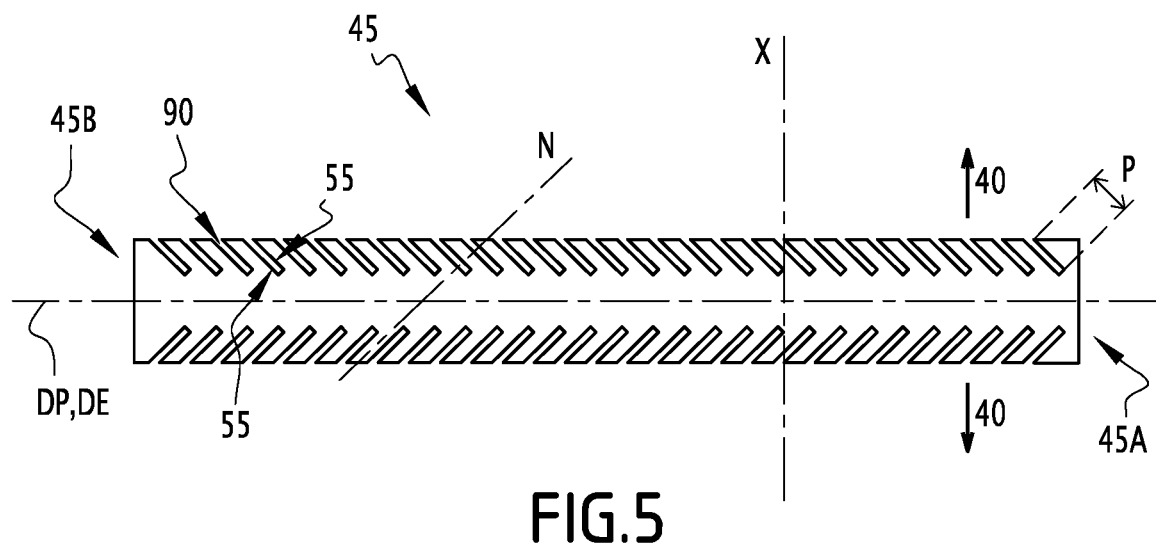
Figure 6:
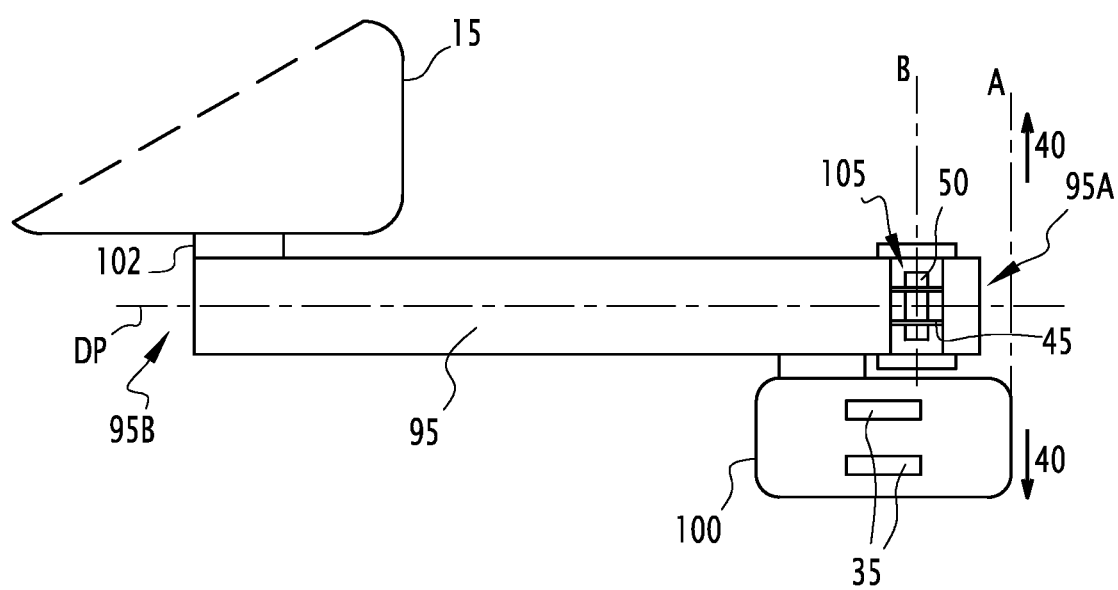
Figure 7:
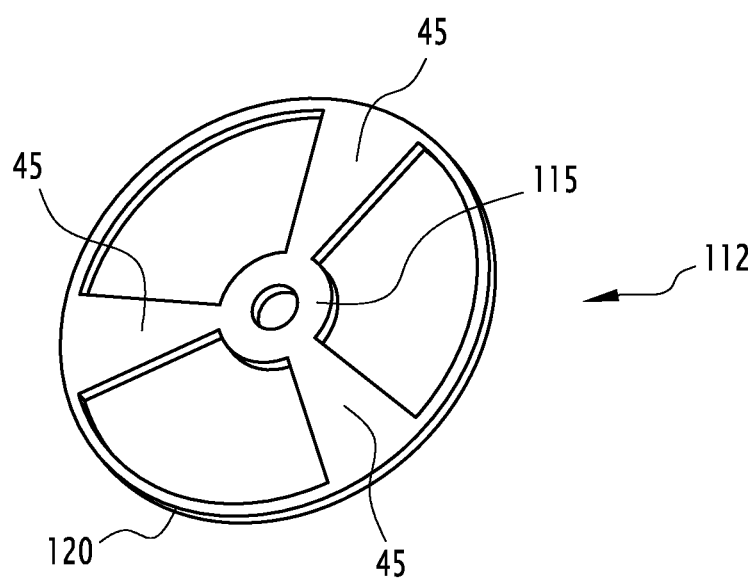
Figure 8:
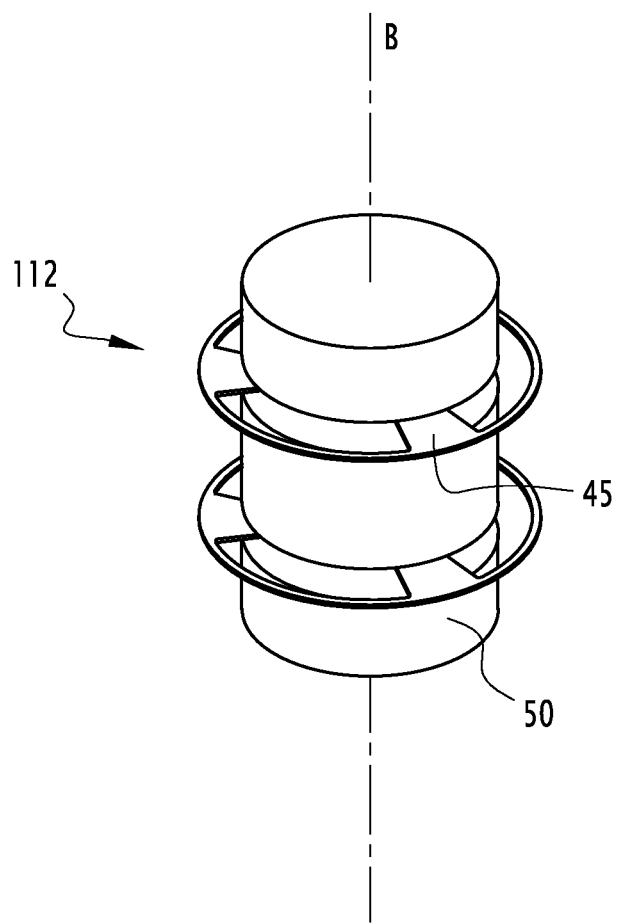

Characteristics and advantages of the invention will become apparent upon reading the following description, given only as a nonlimiting example, referring to the attached drawings, in which:

FIG. 1 is a partial schematic representation of a vehicle equipped with a device comprising a set of vibration absorbers, each vibration absorber comprising at least one deformation part, FIG. 2 is a cross-sectional schematic view of an example deformation part of FIG. 1, FIG. 3 is a cross-sectional schematic view of another example deformation part of FIG. 1, FIG. 4 is a cross-sectional schematic view of another example deformation part of FIG. 1, FIG. 5 is a cross-sectional schematic view of another example deformation part of FIG. 1, FIG. 6 is a schematic view of tan example vehicle of FIG. 1, FIG. 7 is a perspective schematic view of an example deformation part of FIG. 6, and FIG. 8 is a perspective schematic view of an example vibration absorber comprising the deformation part of FIG. 7.

Several deformable parts are described in the description below. Unless otherwise stated, the shapes of the parts are described when the part is at rest, free of any deformation. For example, a part described as parallelepipedal or planar is parallelepipedal or planar when the part is not in motion but is stationary in the absence of external stress.

An example vehicle 10 is partially depicted in FIG. 1.

The vehicle 10 is, for example, an aircraft such as a plane or helicopter.

In one variant, the vehicle 10 is a land vehicle such as a wheeled vehicle or a tracked vehicle.

The vehicle 10 comprises a platform 15. The vehicle 10 is also equipped with a device 20.

The platform 15 is a rigid structure suitable for holding the various components of the vehicle in position. For example, the platform is a chassis on which are mounted means of lifting or propelling the vehicle, such as an engine, wings or a rotor. Alternatively, the platform is a rigid shell defining an internal compartment of the vehicle 10, for example a fuselage.

The device 20 is mounted on the platform 15. For example, the device 20 is attached to the platform 15.

The device 20 comprises a body 25 and a set of vibration absorbers 30.

The body 25 comprises, for example, a set of functional elements 35 each of which can perform a function such as detection, measurement, emission or projection.

At least one functional element 35 is, for example, an imager such as a camera or a thermal camera, capable of generating an image from visible, infrared or ultraviolet electromagnetic radiation.

Alternatively, at least one functional element 35 is a radar or lidar. Radar (radio detection and ranging) is a system that uses electromagnetic waves to detect the presence and determine the position and speed of objects. Lidar (light detection and ranging or laser detection and ranging) is a system that uses a beam of light, such as a visible, infrared or ultraviolet laser beam, to detect the presence and determine the position and speed of objects.

In another embodiment, at least one functional member 35 is a light projector, such as a headlamp, suitable for generating a light beam to illuminate objects around the vehicle 10.

In another embodiment, at least one functional element 35 is an accelerometer or a gyrometer.

However, other examples of functional elements 35 are also possible.

The body 25 is configured to support the functional member(s) 35 and to hold the functional member(s) 35 in position relative to the platform 15.

The body 25 is attached to the platform 15. For example, the body 25 is fixed under the platform 15 when the vehicle 10 is in a usual use position, for example when the vehicle 10 is travelling in flight, on the ground or moving on the ground. Alternatively, the body 25 is fixed above the platform 15, or inside the platform 15

In the example shown in FIG. 1, the body 25 is a parallelepiped attached at one end to the platform 15.

The body 25 extends in a main direction DP. The main direction is the direction in which the longest side of the parallelepiped extends.

However, it should be noted that the shape of the body 25 may vary. The main direction DP is then the direction in which the body 25 has the longest dimension.

The body 25 is capable of oscillating relative to the platform between two positions called third position and fourth position.

In particular, "oscillate" means that the body 25 undergoes a periodic or pseudo-periodic motion between the third position and the fourth position. This is symbolically depicted by arrows 40 in FIG. 1.

It should be noted that, in other words, the body 25 oscillating "between the third position and the fourth position" is likely to be said to be oscillating "about a first equilibrium position".

The third and fourth positions are the extreme positions of the oscillating motion of the body 25.

The motion is, for example, an elastic deformation of the body 25 as a result of a motion of the vehicle 10 or an impact to the device 20 or the vehicle 10.

In particular, one part of the body 25 is set in motion relative to another part of the body 25, for example a free end 25A of the body 25 is set in motion relative to an end 25B of the body 25 attached to the platform 15.

The end 25B is, for example, attached to the platform 15 via a fastener 42, or is attached directly to the platform 15.

For example, the body 25 is moved by the impact or motion to its third position, the elasticity of the body 25 or of the fasteners 42 of the body 25 to the platform 15 causing the body 25 to move to its fourth position, the elasticity then causing the body to move to the third position, and so on. In particular, when the body is in one of the third and fourth positions, elasticity tends to return the body 25 to its equilibrium position, called the "first equilibrium position", with inertia driving the body 25 towards the other of the third and fourth positions.

The motion is said to be "periodic" if each motion of the body 25 ends in the third or fourth position at a fixed frequency. The motion is said to be "pseudo-periodic" if the amplitude or frequency of the motions varies with time, especially if the amplitude decreases with time. In the latter case, the third and fourth positions vary with time.

According to the example in FIG. 1, the body 25 is capable of bending between the third and fourth positions in the direction represented by the arrows 40. A bending motion is, for example, a motion in which the body 25 wraps around an axis perpendicular to the main direction DP. For example, a motion in which each point on an external surface of the body 25 moves at any time in a direction parallel to an axis A, the axis A being perpendicular to one of the sides of the parallelepiped, is an example of a bending motion.

According to the example in FIG. 1, the oscillation of the device 20 causes the free end 25A to move relative to the end 25B along the axis A.

In particular, the axis A is a vertical axis when the vehicle 10 is in operation.

A first natural frequency f01 is defined for body 25. The first natural frequency f01 is the frequency at which the body 25 oscillates between the third and fourth positions when the body 25 is moved to one of the third and fourth positions and then left free to oscillate without a force being imposed on the body 25 to set it in motion. In other words, the first natural frequency f01 is the frequency at which the body 25 naturally oscillates without external stress between the third and fourth positions.

The first natural frequency f01 is the inverse of a natural time period of the body 25, this natural time period being the time duration between the moment when the body 25 reaches its third position and the next moment when the body 25 reaches its third position after having reached its fourth position.

The term "first natural frequency" is used here to identify a natural frequency of the body 25, while the term "second natural frequency" will be used below to identify a natural frequency of a vibration absorber 30. However, these terms do not define an orderly relationship between these two natural frequencies; in particular, they do not imply that one is necessarily higher or lower than the other.

The first natural frequency f01 is between 10 Hertz (Hz) and 5,000 Hz, for example between 100 Hz and 1,000 Hz. It should be noted that the first natural frequency f01, and more generally each natural frequency, is likely to vary with temperature.

In the example shown in FIG. 1, the device 20 comprises six vibration absorbers 30. However, the number of vibration absorbers 30 may vary.

Each vibration absorber 30 is mounted on the body 25. In particular, each vibration absorber 30 is supported by the body 25. Thus, each vibration absorber 30 is suspended from the platform 15 via the body 25. In particular, the vibration absorber 30 is not directly attached to or in contact with platform 15.

Each vibration absorber 30 is movable relative to the body 25 between a position called first position and a position called second position. Each vibration absorber 30 is capable of oscillating between the first and second position relative to the body 25.

It should be noted that, in other words, an absorber 30 oscillating "between the first and second position" is likely to be said to oscillate "about a second equilibrium position".

Specifically, each vibration absorber 30 is configured to oscillate between the first and second positions when the body 25 oscillates between the third and fourth positions.

In particular, each vibration absorber 30 is arranged to move between the first and second positions in a direction identical to the direction in which the body 25 moves between the third and fourth positions. For example, each vibration absorber 30 is adapted to move along the axis A between the first and second positions.

However, the direction of movement of the vibration absorber 30 between the first and second positions may vary.

A second natural frequency f02 is defined for each vibration absorber 30.

The second natural frequency f02 of at least one vibration absorber 30 is different from the second natural frequency f02 of at least one other vibration absorber 30.

Each second natural frequency f02 is between 8 Hz and 6,000 Hz. A difference is defined between each second natural frequency f02 and the first natural frequency f01 of the body 25. In a particular embodiment, each difference is less than or equal to 20 percent (%) of the first natural frequency f01, in particular less than or equal to 10 Hz. It should be noted that the frequency distribution of the second natural frequencies f02 may vary. For example, alternatively, at least one difference is greater than or equal to 20% of the first natural frequency f01.

According to one embodiment, the second natural frequency f02 of at least one vibration absorber 30 is strictly higher than the first natural frequency f01 and the second natural frequency f02 of at least one vibration absorber 30 is strictly lower than the first natural frequency f01.

The second natural frequencies f02 are, for example, chosen to limit the amplitude of the oscillation of the body 25 relative to the platform 15 or the mechanical energy associated with the deformation of the body 25.

In particular, the vibration absorbers 30 form a multiple tuned mass damper (MTMD) device, wherein the vibration absorbers 30 are selected to limit the amplitude of oscillations of the body 25 and/or the mechanical energy associated with the deformation of the body 25.

The second natural frequencies f02 are, for example, chosen according to a frequency distribution as mentioned in US 2014/0008162 A1.

Each vibration absorber 30 comprises at least one deformation part 45. Optionally, at least one vibration absorber 30 further comprises a weight 50.

In the example shown in FIG. 1, two of the vibration absorbers 30 each comprise a weight 50. Alternatively, each vibration absorber 30 comprises a weight 50.

Each deformation part 45 is able to deform during the oscillation of the vibration absorber 30 between the first and second positions. In particular, each deformation part 45 has a different shape when the vibration absorber 30 is in the first position than the shape of the deformation part 45 when the vibration absorber 30 is in the second position.

Each deformation part 45 extends, for example, in a direction of elongation DE. According to the example in FIG. 1, each deformation part 45 extends in the main direction DP, i.e. the direction of elongation DE of each deformation part 45 is the main direction DP.

It should be noted that the direction of elongation DE may vary. For example, in one embodiment, the direction of elongation DE is perpendicular to the axis A and to the main direction DP.

Each deformation part 45 has a first end 45A and a second end 45B. Each deformation part 45 extends between the first end 45A and the second end 45B.

A length of the deformation part 45, measured between the first and second ends 45A and 45B, is between 5 millimetres (mm) and 50 centimetres (cm). However, this length may vary, especially depending on the desired second natural frequency f02 of the vibration absorber 30 in question.

According to the example shown in FIG. 1, the first end 45A is free and the second end 45B is attached to the body 25.

Each deformation part 45 is, for example, suitable for bending deformation during the oscillation of the vibration absorber 30. In particular, the first end 45A moves along the axis A between the first position and the second position.

According to one embodiment, each deformation part 45 is a plate perpendicular to the axis A. In particular, the plate extends along the main direction DP, i.e. it has its largest dimension along the main direction DP. Instead, the thickness of the plate is measured along the axis A, i.e. the smallest dimension of the plate is measured along the axis A.

The plate has, for example, a rectangular shape in a plane perpendicular to the axis A. However, the shape of the plate may vary.

Each deformation part 45 has faces 55, known as "shear faces", which can be seen in particular in FIG. 2.

Each shear face 55 is configured to bear against another shear face 55 as the deformation part 45 deforms during the oscillation of the vibration absorber 30. In particular, each shear face 55 is configured to exert a shear force on the other shear face 55 that it bears against during the oscillation of the vibration absorber 30. For example, each shear face 55 is configured to rub against the other shear face 55.

In particular, "shear force" means a force directed in the plane formed, at the point where the force is applied, by the faces 55 bearing against each other. Such a force occurs in particular when a force tending to move one of the faces 55 in a direction of this plane is exerted by the other face 55.

Relative movement between the shear faces 55 in the plane formed at the point of interest by the shear faces 55 is an example of relative motion of the shear faces 55 that may generate a stress load if the shear faces 55 rub against each other.

A shearing force also occurs when the side 55 to which the force is applied moves together with the other side 55. In such a case, the shear force causes a deformation of the element in which the face 55 to which the force is applied is provided, in order to accommodate the movement of that face 55.

According to an embodiment shown in cross-section in FIG. 2, the deformation part 45 comprises a stack of strips 60 superimposed along a stacking direction X. Optionally, the deformation part 45 further comprises at least one resin layer 65. For example, a resin layer 65 is interposed along the stacking direction X between each pair of adjacent strips 60.

In one embodiment, each layer 65 is an elastomer layer and not a resin layer.

The stacking direction X is, for example, parallel to the axis A.

The stacking direction X is, for example, perpendicular to the direction of elongation DE.

Each strip 60 extends in a plane perpendicular to the stacking direction X.

Each strip 60 is, for example, made of a metallic material such as steel, especially stainless steel. Alternatively, each strip 60 is made of a composite material.

Each strip 60 has a thickness, measured along the stacking direction X, of between 10 microns (μm) and 5 mm, in particular between 25 μm and 200 μm. The strips 60 are, for example, attached to each other at each end 45A, 45B of the deformation part by a bolt 70.

Alternatively, the strips 60 are held together by the resin layers 65.

The strips 60 are, for example, intended to rub against each other when deforming the deformation part 45. For example, the shear faces 55 are the faces of the strips 60 that delimit the strips 60 along the stacking direction X. The shear faces 55 are, in particular, perpendicular to the stacking direction X.

In particular, when the deformation part 45 is deformed by the oscillation of the vibration absorber 30, in particular when the first end 45A is moved relative to the second end 45B along the stacking direction X as indicated by the arrows 40 in FIG. 2, the shear faces 55 opposite one another on adjacent strips 60 rub against each other.

Alternatively, during deformation, a face of a strip 60 carries with it a face of a resin layer 65 which is in contact with the strip 60. In this case, the shear faces 55 are the faces of the strips 60 and the faces of the resin layers 65. The movement of the resin layer face 65 then causes the resin layer 65 to deform by shearing.

In the example shown in FIG. 2, each resin layer 65 extends along the entire length of the deformation part 45. In particular, each resin layer 65 is bounded along the direction of elongation DE by the two faces of the deformation part 45 which bound the deformation part 45 along the direction of elongation. Thus, a length of each resin layer 65, measured along the direction of elongation DE, is equal to the length of the deformation part 45.

However, embodiments in which at least one resin layer 65, in particular each resin layer 65, has a length less than the length of the deformation part 45, are also conceivable. Each resin layer 65 has a thickness, measured along the stacking direction X, of less than or equal to 15 μm, for example between 0.5 μm and 1.5 μm.

Each resin layer 65 is made of a polymeric material, for example a polymer obtained by polymerisation of epoxy monomers. Such a material is frequently referred to as "epoxy resin". It should be noted that the composition of the resin layers 65 may vary from layer to layer.

According to another example of a deformation part 45, shown in FIG. 3, the deformation part 45 comprises a stack of strips 60 and at least one shear part 75 interposed between two strips 60. For example, the deformation part 45 comprises two strips 60 and a plurality of shear parts 75 interposed between the two strips 60. Alternatively, the deformation part 45 may have no shear part 75 or may have a single shear part 75.

A single strip 60 among the strips 60 is, for example, directly attached to the body 25, in particular at one of its ends, while the other strips 60 are not attached to the body 25. According to one embodiment, the vibration absorber 30 comprises a weight 50 attached to a strip 60 which is not attached to the body 25 while another strip 60 is attached to the body 25.

Alternatively, each strip 60 is directly attached to the body 25 and the weight 50 together.

Each strip 60 has a thickness, measured in the stacking direction X, of for example between 1 mm and 5 mm.

According to one embodiment, the shear parts 75 are aligned with each other along the direction of elongation DE, for example the main direction DP.

In the example shown in FIG. 3, the two strips 60 are attached to each other by bolts 80, for example three bolts 80.

Each shear part 75 rests against the two strips 60 that frame it in the stacking direction X.

Each shear part 75 is, for example, a plate, in particular a metal plate. In one embodiment, the shear part 75 is made of steel. However, the material from which the shear part 75 is made may vary.

Each shear part 75 is perpendicular to the stacking direction X.

The shear part 75 has a thickness, measured in the stacking direction X, of for example between 1 mm and 5 mm.

The shear part 75 has a length, measured in the direction of elongation DE, of between 2 mm and 50 cm.

According to the embodiment shown in FIG. 3, each floating part 75 corresponds to a bolt 80, with the shear part 75 having the corresponding bolt 80 passing through it.

Each bolt 80 passes successively through one strip 60, the corresponding shear part 75 and the other strip 60.

In one embodiment, at least one bolt 80 is loosened from the maximum possible tightness for that bolt 80. For example, a single bolt 80 among the bolts 80 is tightened to its maximum while the other bolts 80 are tightened to their maximum and then loosened from their maximum. In particular, the remaining bolts 80 are loosened from the maximum tightness by a number of turns between one-tenth of a turn and one-and-a-half turns.

During the oscillation of the vibration absorber 30, the shear part 75 rubs against the strips 60. Thus, the shear faces 55 are the faces of the strips 60 and the shear parts 75 that are perpendicular to the stacking direction X.

According to a third example of a deformation part 45, shown in FIG. 4, the deformation part 45 comprises a stack of strips 60 superimposed along a stacking direction X, similar to the stacking of the first and second examples, and at least one rib 85.

For example, the deformation part 45 comprises a reinforcement layer 87 interposed along the stacking direction X between two contiguous strips 60, as seen in FIG. 4. The reinforcement layer 87 has a plurality of ribs 85.

In the example shown in FIG. 4, the deformation part 45 has two strips 60. However, embodiments in which the deformation part 45 has more than two strips 60 and at least two reinforcement layers 87 are also possible.

Each rib 85 extends in a plane perpendicular to the stacking direction X.

Each rib 85 extends, for example, in the direction of elongation DE or in a direction perpendicular to the direction of elongation DE and the stacking direction X. Alternatively, some ribs 85 extend in a direction at an angle other than 90 degrees to the direction of elongation DE.

According to the example shown in FIG. 4, the ribs 85 define a set of cells 88 in the reinforcement layer 87. In particular, each cell 88 is delimited in a plane perpendicular to the stacking direction X by the ribs 85. It should be noted that embodiments in which the ribs 85 do not delimit cells, for example if the ribs 85 are all parallel to each other, are also possible.

Each rib 85 has a thickness, measured in the stacking direction X, of for example between 1 mm and 5 mm.

Each cell 88 has dimensions, measured in a plane perpendicular to the stacking direction X, of, for example, between 5 mm and 50 mm.

It should be noted that the dimensions of the cells 88 may vary.

In one embodiment, the cells 88 are identical to each other. Alternatively, the cells 88 of a single deformation part 45 may differ from each other. For example, at least one dimension of the cells 88 varies between the first end 45A and the second end 45B.

Each rib 85 bears against a shear face 55 of each strip 60 between which the rib 85 is interposed in the stacking direction X.

In one embodiment, the reinforcement layer 87 is configured to allow relative motion between the strips 60 bearing against the reinforcement layer 87 and the reinforcement layer 87.

The reinforcement layer 87 is, for example, attached to the adjacent strips 60 at the ends 45A and 45B of the deformation part 45, for example by bolts, or by bonding, but at least a portion of the reinforcement layer 87 disposed between the ends 45A and 45B is not directly attached to the strips 60, so that relative motion between the strips 60 and the reinforcement layer 87 is possible at this portion.

Thus, during the oscillation of the vibration absorber 30, the shear faces 55 of the strips 60 rub against the faces of the reinforcement layer 87 against which they bear, those faces thereby also acting as shear faces 55.

Alternatively, the shear faces 55 of the strips 60 are rigidly connected to the faces of the layer 87 against which they bear, the deformation of the deformation part 45 then causing a deformation by shearing of the reinforcement layer 87.

According to a fourth example of a shear part 45, shown in FIG. 5, the deformation part 45 is a single piece.

For example, the deformation part 45 is a plate extending along a direction of elongation DE and perpendicular to a direction X along which the thickness of the plate is measured. For example, the direction of elongation DE is the main direction DP and the direction X is parallel to the axis A.

Alternatively, the deformation part 45 is a beam. However, other forms of deformation parts 45 are possible.

The deformation part 45 is, for example, made of a metallic material, in particular steel, stainless steel or aluminium. Alternatively, the deformation part 45 is made of a polymeric material or a composite material.

The deformation part 45 comprises slots 90. Each slot 90 is fashioned, for example machined, in the deformation part 45.

Each slot 90 is, for example, bounded by two flat shear faces 55 fashioned in the deformation part 45. Each slot 90 opens, in particular, on at least one side of the deformation part 45.

According to the example shown in FIG. 5, each slot 90 opens on one side perpendicular to the direction X and on the two side faces which are parallel to the direction of elongation DE and to the direction X.

Each slot 90 extends, for example, in a plane perpendicular to a normal direction N included in a plane comprising the direction of elongation DE and the direction X. It should be noted that slots 90 having a curvilinear profile, i.e. in which the normal direction N varies from one point to another, are also possible.

An angle between the direction of elongation DE and the normal direction N is, for example, greater than or equal to 30 degrees)(°, for example between 30° and 60°.

It should be noted that the orientation of the slots 90 may vary. For example, the angle between the direction of elongation DE and the normal direction N is likely to vary from one slot 90 to another.

Each slot 90 has a width, measured in the normal direction N between the two shear faces 55 of the slot 90, of, for example, between 0.01 mm and 5 mm.

It should be noted that the width of the slots 90 may vary, in particular according to the dimensions of the deformation part 45 and the amplitude of the oscillations of this deformation part 45.

Each slot 90 has a depth P, measured in a plane perpendicular to the normal direction N, from a surface of the deformation part 45 of, for example, 20 µm to 5 cm.

In particular, the number of slots 90 is chosen according to the desired properties of the vibration absorber 30.

During the deformation of the deformation part 45, the shear faces 55 of some slots 90 are brought closer to each other until they bear against each other. The resulting friction thus contributes to the dissipation of mechanical energy, and thus to the damping of the oscillation of the body 25.

As mentioned above, each of the deformation parts 45 described above is likely to belong to a vibration absorber 30 comprising a weight 50.

Each weight 50 is supported by the deformation part(s) 45 of the respective vibration absorber 30. In particular, each weight 50 is connected to the body 25 via the deformation part(s) 45.

Each weight 50 is suspended from the body 25 via the deformation part(s) 45. In particular, the weight 50 is not directly attached to the body 25, and is not in contact with the body 25.

Each weight 50 has a mass. The mass of the weight 50 is chosen so that the second natural frequency f02 of the vibration absorber 30 in question has a predefined value. To this end, the shape, material and volume of each weight 50 may vary from one weight 50 to another.

When the body 25 oscillates between the third and fourth position, the vibration absorbers 30 are set in motion relative to the body 25. Thus, some of the mechanical energy of the system is directed into the oscillation modes of the vibration absorbers 30 and not into the oscillation mode or modes of the body 25. The amplitude of the oscillations of the body 25 is therefore reduced.

Through the use of shear faces 55 in the deformation part 45, it is possible to vary the properties of the vibration absorbers 30, in particular to select desired values of the damping ratio of the vibration absorber 30, or the stiffness of the vibration absorber 30. In particular, it is possible to vary these properties independently of the materials used, for example by changing the number or surface area of the shear faces 55, or the bearing force between these shear faces 55. This is particularly interesting as the damping ratio is generally a difficult parameter to control for state-of-the-art vibration absorbers.

In particular, the shear faces 55 allow a greater dissipation of the mechanical energy linked to the oscillating motion of the body 25, and therefore a faster damping of this motion. These shear faces 55 exert a shearing force on each other, allowing energy to be dissipated via the friction of the shear faces against each other and/or via the deformation resulting from the shearing.

The properties of the deformation parts 45 are then likely to vary over a wider range than prior art vibration absorbers which do not have shear faces 55 and are therefore limited by the properties of the materials used.

The damping ratio is a dimensionless measure describing how the oscillations of a physical system change and decay over time. The damping ratio is often defined as the ratio of the maximum energy dissipated during a period of oscillation to the maximum energy of deformation of the system in question during that same cycle.

The stiffness expresses the proportional relationship between the force F applied at a point and the resulting bend x at that point. In particular, it is equal to the ratio between the force F and the deflection x.

Furthermore, the mechanical behaviour of the vibration absorbers 30, and thus their ability to limit the amplitude of the oscillations of the device 20, varies little as a function of frequency of these oscillations and the temperature, since the mechanical properties of the friction between the shear faces 55 are very stable. In particular, the damping ratio and stiffness vary very little with temperature.

A deformation part 45 with stacked strips 60 can be easily adapted to obtain the desired properties by simply varying the number of strips 60 used. In particular, the stiffness, mass and damping properties of such a deformation part 45 vary greatly with the number of strips 60 when considering a bending deformation of the deformation part 45.

The presence of the resin layer 65 between the strips 60 allows the strips 60 to be fixed together while allowing relative motion between them so as to allow friction between the strips 60 during oscillation while maintaining the integrity of the deformation part 45.

In addition, it is easy to manufacture stacks of strips 60 connected to each other by layers of resin 65, and to adapt the properties of the deformation part 45 thus obtained by removing strips 60, in particular by hand, until the desired properties are obtained. The deformation parts 45 are therefore highly adjustable, and can be adapted to changes in the natural frequency f01 (e.g. if functional elements 35 are modified or added to the device 20) without additional equipment.

In particular, the stiffness and damping ratio of a deformation part 45 with one or more shear members 75 bolted to the strips 60 can be easily changed and adapted by changing the tightening of the bolts 80.

The use of ribs 85 also allows the stiffness properties of the deformation part 45 to be varied, particularly when the number or dimensions of the ribs 85 and the cells 88 which they delimit vary, for example from one deformation part 45 to another.

The use of the weights 50 makes it possible to adapt the mass of the vibration absorber 30 and thus to change the second natural frequency f02 of the vibration absorber 30, without changing the stiffness or the damping ratio of the vibration absorber 30. This makes it easier to obtain a set of vibration absorbers 30 with properties, including stiffnesses, masses and damping ratios, that allow optimum damping of the motion of the body 25.

A second example vehicle 10 depicted in FIG. 6 will now be described. Elements identical to the first example vehicle 10 are not described again. Only differences are highlighted.

The body 25 comprises a support 95 and a head 100 which contains the functional elements 35.

The support 95 is, for example, a beam, as shown in FIG. 6. Alternatively, the support 95 is a plate or other type of structure for suspending the head 100 from the platform 15.

The support 95 extends in the main direction DP.

The bracket 95 has a third end 95A and a fourth end 95B.

The support 95 is, for example, a beam with a square or rectangular cross-section. In particular, each side of the support 95 is perpendicular either to the main direction DP or to the axis A or to a direction perpendicular to the axis A and to the main direction DP.

The third end 95A is free.

The head 100 is attached to the third end 95A, for example under the third end 95A when the vehicle 10 is in operation.

The fourth end 95B is attached to the platform 15. For example, the fourth end 95B is attached to the platform 15 via one or more fasteners 102, or attached directly to the platform 15.

The support 95 is capable of bending as the body 25 oscillates between the third and fourth positions in the direction represented by the arrows 40. According to the example in FIG. 6, the oscillation of the device 20 causes the free end 95A to move relative to the end 95B along the axis A.

Each vibration absorber 30 is attached to the third end 95A of the support 95.

According to the example shown in FIG. 6, each vibration absorber 30 is accommodated in an opening 105 in the third end 95A of the support 95.

Each opening 105 extends along the axis A along which the third end 95A moves relative to the fourth end 95B when the support 95 bends. Each opening 105 is, for example, cylindrical, i.e. it has a circular cross-section in a plane perpendicular to the axis A and has a constant diameter. However, the shape of the opening 105 may vary.

Alternatively, the opening 105 has a shoulder defining a first section and a second section of different diameter to the first section.

Each opening 105 opens onto at least one side of the support 95, for example each opening opens at each of its two ends onto a side of the support 95. In FIG. 6, the opening 105 is open at both ends. It should be noted that cases where the opening 105 only opens at one of its ends are also possible.

Each vibration absorber 30 comprises at least one deformation part 45 and a weight 50.

Each deformation part 45 is designed to allow the corresponding weight 50 to move in a direction of movement, which is for example parallel to the axis A.

For example, each weight 50 is supported by at least two deformation parts 45 which surround the weight 50 in a plane perpendicular to the direction of movement of the weight 50.

According to the example in FIG. 6, each vibration absorber 30 comprises at least two groups of deformation parts 45, these groups being offset from each other along the axis A.

Each group of deformation parts 45 is a set of deformation parts extending in a single plane perpendicular to the direction of movement of the weight.

For example, each group is a deformation element 112 comprising at least two deformation parts 45.

The deformation element 112 is, for example, such that the deformation parts 45 of the deformation element 112 are integral with each other. For example, the deformation parts 45 comprise a single stack of strips 60 as shown in any one of FIGS. 2 to 4, the strips 60 having, in a plane perpendicular to the stacking direction X, a shape suitable for defining a plurality of deformation parts 45.

Alternatively, the deformation parts 45 of the deformation element 112 are attached to each other without being integral therewith, or the deformation parts 45 of the same group are not attached to each other.

A deformation element 112 comprising three deformation parts 45 is shown in FIG. 7.

It should be noted that the number of deformation parts 45 in each group may vary.

The deformation parts 45 of the same group extend radially outwards from the weight 50 in a plane perpendicular to the direction of movement of the weight 50. This can be seen in FIG. 8.

In particular, "radially outwards" is understood to mean that each deformation part extends along an eigenline, the eigenlines intersecting at one point, this point being accommodated in the weight 50.

The deformation element 112 comprises, for example, an inner ring 115 and an outer ring 120 which are concentric and coplanar, with each deformation part 45 extending radially from the inner ring 115 to the outer ring 120. Thus, the first end 45A is attached to the inner ring 115 and the second end 45B is attached to the outer ring 120.

It should be noted that in one embodiment, the inner 115 and outer 120 rings may each extend in a plane distinct from the plane in which the other 115, 120 ring of the same group of deformation parts 45 extends. In particular, this allows the group of deformation parts 45 to be pre-stressed and thus allows the stiffness and/or damping ratio of the vibration absorber 30 to be changed.

The inner ring 115 has a diameter of, for example, 2 mm or more.

The outer ring 120 is attached to the body 25, in particular to the walls of the support 95 which define the opening 105 in which the vibration absorber 30 is accommodated.

The outer ring 120 has a diameter greater than or equal to, for example, 5 mm.

It should be noted that, although the rings 115 and 120 are represented in FIG. 7 as being rings with a circular base, i.e. rings delimited in a plane perpendicular to the direction of movement by concentric circles, it is possible that these rings 115 and 120 are rings with a polygonal base delimited by polygons having a homothetic relationship between them, or even rings with any base.

Each weight 50 extends along an axis B which is parallel to the direction of travel. In particular, the axis B comprises the centres of the inner 115 and outer 120 rings of each deformation element 112.

In particular, the weight 50 is rotationally symmetrical about the axis B. Each weight 50 is, for example, cylindrical. In such a case, the weight 50 has a diameter greater than or equal to, for example, 3 mm. In particular, the diameter of the weight 50 is between the diameter of the inner ring 115 and the diameter of the outer ring 120.

Alternatively, each weight 50 is parallelepipedic or has any cross-section. In this case, each section of the weight in a plane perpendicular to the axis B has a centre of gravity, the centre of gravity being, for example, a point on the axis B. The centre of gravity is, for example, the intersection of the diagonals of the section when the section is rectangular.

In the example shown in FIG. 8, the centres of gravity of the different weight sections are aligned along the axis B. Alternatively, the centres of gravity of the different weight sections 50 may not be aligned along the axis B, for example if the centres of gravity are not aligned with each other.

In particular, this encourages the development of other modes of vibration of the vibration absorber 30, which help to improve the damping of the body 25.

The weight 50 is attached to the inner ring 115. In particular, the inner ring 115 of each deformation element 112 is accommodated in the weight 50, as seen in FIG. 8. For example, the weight 50 consists of at least two separate parts aligned along the direction of travel with the inner ring 115 interposed between them.

There are many ways to attach the weight to the deformation elements 112, including attachment by one or more bolts.

During the oscillation of the vibration absorber 30, the weight 50 moves along the axis B within the opening 105. This movement leads to the bending deformation of each deformation part 45, in particular via a movement along the axis B of the first end 45A with respect to the second end 45B.

The vibration absorbers 30 shown in FIGS. 6 to 8 provide effective damping of the oscillations of the body 25, including a reduction in the amplitude of these oscillations, without increasing the volume or dimensions of the body 25. In addition, these vibration absorbers 30 are easily adaptable, for example by replacing the weight 50 with a weight 50 of different mass.

It should be noted that such vibration absorbers 30, although described as being integrated into a device 20 whose body 25 comprises a support 95, in particular a beam 95, and a head 100, are likely to be used in other types of devices 20.

It should also be noted that embodiments in which the vibration absorbers 30 are in accordance with any of the example vibration absorbers of FIGS. 1 to 5 are also possible.

It should also be noted that only one mode of oscillation of the body 25 has been described above, i.e. oscillation in a single direction at a single natural frequency f01, however multiple modes of oscillation of the body 25 are conceivable, each mode corresponding to a distinct set of vibration absorbers 30, the vibration absorbers 30 corresponding to one oscillation mode being configured in particular to move between their first and second positions in a direction different from the direction corresponding to the other modes and/or to oscillate with natural frequencies f02 different from the natural frequencies f02 of the vibration absorbers 30 corresponding to the other oscillation modes.

Furthermore, the motions of the body 25 and the deformation parts 45 have been described above as bending motions. However, it is also possible that the body 25 and the deformation parts 45 undergo motions other than bending during the oscillation of the body 25 and the vibration absorbers 30, e.g. torsion or tilting modes.

Furthermore, the oscillations of the body have been described above as being related to a deformation of the body 25, especially a bending. However, cases where the oscillation is caused by elastic deformation of the fastener(s) 42, 102 are also possible.

The invention claimed is:

1. A device comprising a body and a set of vibration absorbers mounted on the body, each vibration absorber being capable of oscillating relative to the body between a first and a second position, a first natural frequency being defined for each vibration absorber, at least one vibration absorber having a first natural frequency different from the first natural frequency of another vibration absorber, each vibration absorber comprising at least one deformation part capable of deforming when the vibration absorber oscillates between its first position and its second position, the deformation part having at least two faces configured to exert a shear force on each other upon deformation of the deformation part, the faces configured to exert a shear force on each other during deformation of the deformation part being configured to rub against each other during deformation of the deformation part.

2. The device according to claim 1, wherein each deformation part comprises a stack of strips superimposed along a stacking direction, the deformation part extending along a direction of elongation between a first end and a second end fixed to the body, the direction of elongation being perpendicular to the stacking direction, the deformation part being configured to deform by bending upon oscillation of the vibration absorber, the bending causing a movement of the first end along the stacking direction relative to the second end.

3. The device according to claim 2, wherein each deformation part further comprises at least one layer, chosen between a layer of resin or a layer of elastomer, interposed between two strips.

4. The device according to claim 2, wherein each deformation part comprises at least one rib interposed between two strips, each rib extending in a plane perpendicular to the stacking direction.

5. The device according to claim 4, wherein each deformation part comprises a reinforcement layer interposed between two strips, the reinforcement layer comprising a set of ribs, the set of ribs delimiting in particular, in a plane perpendicular to the stacking direction, a set of cells.

6. The device according to claim 1, wherein each vibration absorber comprises a weight suspended from the body via the at least one deformation part.

7. The device according to claim 6, wherein the weight is adapted to move relative to the body in a direction of movement as the vibration absorber oscillates between its first and second positions, each vibration absorber comprising at least two deformation parts extending radially outward from the weight in a single plane perpendicular to the direction of movement.

8. A vehicle equipped with a device according to claim 1, the vehicle being in particular an aircraft.

9. The vehicle according to claim 8, comprising a platform, the body being able to oscillate relative to the platform between a third position and a fourth position, a second natural frequency being defined for the body, the first natural frequency of at least one vibration absorber being strictly lower than the second natural frequency and the first natural frequency of at least one further vibration absorber being strictly higher than the second natural frequency.

10. The vehicle according to claim 8, wherein the body comprises a beam and a head, the beam having a third end and a fourth end and extending in a main direction between the third end and the fourth end, the fourth end being attached to the platform, the body being capable of oscillating relative to the platform between a third position and a fourth position, the head being attached to the third end, each vibration absorber being mounted on the third end of the beam.

* * * * *